Figure 1:
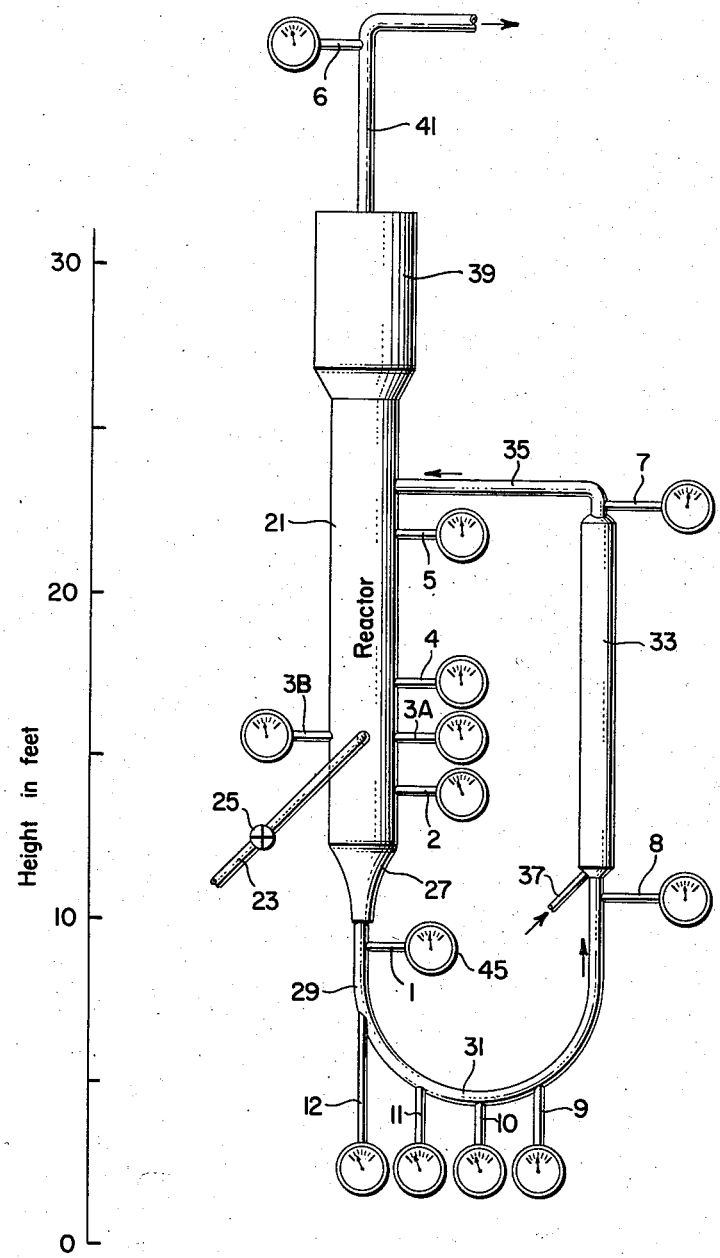

Fig. I.

April 14, 1959  E. D. STOKES  2,882,223
METHOD OF OPERATING A FLUID BED COKING SYSTEM
Filed Jan. 12, 1954  2 Sheets-Sheet 2

INVENTOR
Edward D. Stokes
BY
ATTORNEY

2,882,223

METHOD OF OPERATING A FLUID BED COKING SYSTEM

Edward D. Stokes, Baton Rouge, La., assignor to Esso Research and Engineering Company, a corporation of Delaware Application January 12, 1954, Serial No. 403,516

1 Claim. (Cl. 208—157)

The present invention relates to a method of operating a fluid bed coking system for heavy hydrocarbon oils and the like. The invention relates particularly to a method or process for controlling the operation of a fluid bed by controlling the feed rate of the oil to be coked in accordance with certain operating characteristics of the fluid bed described hereinafter.

While the use of so-called fluidized solids for carrying out various types of chemical and related reactions has been very successful in some fields, it has been found possible only recently to apply this technique to the coking or thermal conversion of heavy, viscous oils such as petroleum residues and other heavy hydrocarbons.

Several characteristics of heavy oils make it difficult to apply the fluidized solids technique. For example, although relatively volatile oils such as gas oil may be efficiently converted by contacting with preheated fluidized catalytic particles, the conversion of a heavy viscous oil containing tacky, near-solid components is quite another matter. The heavy oil or the tacky components tend to cause the solid particles of a fluid solids system to adhere to each other and to form agglomerates. In many cases, therefore, a fluid bed of solids rapidly bogs down and becomes inoperative.

Recent attempts have been made to operate fluidized solids beds of catalytically inert, heat carrying particles such as particles of coke, sand, glass beads, metal shot, and other particles, and various alumina, silicas, and the like for coking heavy oils at various feed rates. The evaporation of the more volatile parts of the feed, which takes place rapidly on contact of feed with the hot solid particles, frequently leaves a very viscous and tacky residue. This causes much and probably nearly all of the agglomeration and bed bogging troubles mentioned above.

It has been discovered that a fluidized bed of solids for coking or conversion of heavy oils, such as heavy petroleum residues, can be maintained in operation by keeping the feed rate low. In this way all of the feed is promptly evaporated or cracked and the viscous residue quickly dried up so that no substantial agglomeration can take place. But the capacity of a given system becomes very low when operating under conditions that are obviously safe. Unfortunately, the maximum allowable feed rate cannot be predicted with accuracy or safety since it depends upon many factors such as quality of feed, temperature of solids, rate of solids circulation, etc. Hence, in order to be safe it has been considered necessary in the prior art to keep the feed rate well below the rate at which a fluid bed tends to agglomerate and bog down. Obviously, this severely limits the capacity of a coking system. It requires the construction of a relatively large and expensive unit for a relatively small throughput. It would be highly advantageous to be able to operate the coking system at or near its full capacity at all times without running the risk of bogging down the bed. This would avoid the expensive operation of completely shutting down the apparatus and cleaning it out, before starting up anew. To accomplish this near maximum throughput with safety is the major object of the present invention.

To complicate the problem further, it is known that the most desirable types of conversion products, particularly when heavy petroleum oils are to be converted to gasoline and other low boiling products, are obtained by operating the coking system at a relatively low temperature. The preferred range is preferably below about 1000° F. It may be as low as 925° F. or lower in some cases. For commonly available feeds, an operating temperature of about 950° F. in the coking zone is commonly preferred at present. Unfortunately, operation at any temperature below 1000° F. adds to the danger of bogging the bed down even at moderately low feed rates. Any attempt to go to lower temperatures meets with increasing difficulties. The present invention is the result of a discovery that certain operating characteristics of a fluid solids bed, per se, which cannot be accurately predetermined but can be detected continuously during operation, may be used as signals to control the feed rate of the oil to be converted.

Specifically, it has been discovered that the surges in pressure due to the turbulence within the fluid bed have particular frequency or periodicity and amplitude characteristics which indicate the mobility or degree of freedom of movement within the bed. By a relatively simple technique of observing the periodicity or frequency of these surges as well as their amplitude it may be determined with considerable accuracy when the bed is approaching a point of incipient bogging or objectionable agglomeration of particles. This discovery is particularly important since it is never possible to observe visually the condition of a hot fluid bed. The art has not discovered any other simple and effective method for predicting the bogging or agglomeration in advance.

More specifically, it has now been found that when the frequency of certain characteristic pressure surges within a fluid solids bed in a confined vessel begins to decrease markedly from the natural frequency of the dry bed, bogging may be predicted. A dry fluidized bed of hot particulate solids within a given vessel appears to have a natural normal frequency of pressure surges of certain amplitudes. Those of major amplitude are usually most characteristic and easiest to detect and record.

By "major pressure surges" it will be understood that surges of substantial amplitude which are characteristic of a particular physical system are meant. In a small test apparatus, pressure surges such as those of more than one inch of water pressure may be considered major or characteristic of the fluidity of the bed. Minor surges of higher frequency and/or of amplitude so small as to be difficult to measure accurately appear to have no particular significance. In larger apparatus, a major surge may be much greater. Thus in a pilot coking plant of 100 tons/day nominal capacity, pressure surges of at least 15 inches of water were considered characteristic and sufficiently distinctive to be termed "major."

When oil is fed into a fluidized bed at a rate such that agglomeration begins to take place the frequency of the "major" or characteristic pressure surges decreases quite substantially. When this frequency decreases by about 25% below the normal dry bed frequency and the amplitude decreases noticeably, a danger point is indicated. The rate of oil feed should be promptly decreased to permit the bed to dry up and resume normal operation.

Hence, by observing the pressure surges and regulating the feed accordingly, the throughput of a coking system may be kept at or near a maximum with consequent substantial increase in capacity over operations that are possible without means for detecting constantly the bed conditions.

The above conclusion was supported by making tests of fluidization properties in a bed which could be observed visually, viscous or tacky components being introduced or formed in the bed to simulate operation of a coker.

Figure 2:
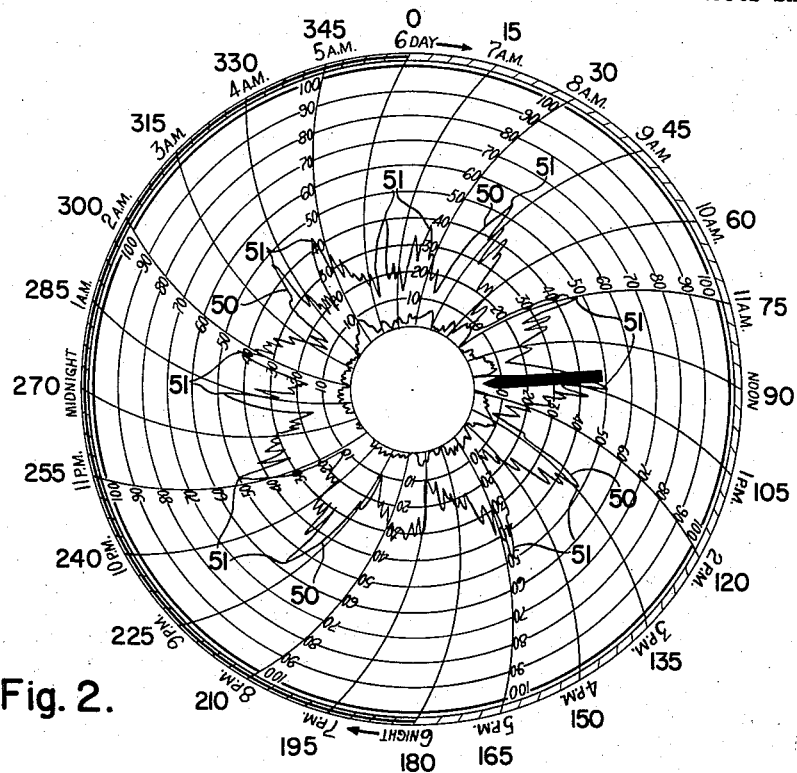
Figure 3:
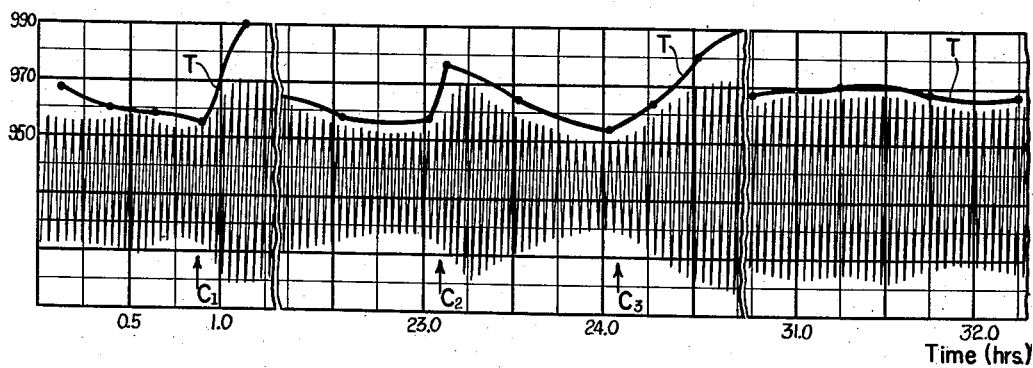

The invention will be more clearly understood by reference to a specific embodiment described and illustrated in the accompanying drawings. In such drawings Fig. 1 shows an elevational view of a test system involving the present invention. Fig. 2 shows a chart of typical fluid bed surges or characteristics which was used to accumulate data in development of the present invention. Fig. 3 shows a chart of temperature variations which also have important effects in a fluidized solids bed system.

Referring first to Fig. 1, a test system was established comprising a major vertical cylindrical vessel 21 which may be considered the reactor of the coking system. This vessel was filled to an appropriate level with suitable fluidizable solid particles comparable in particle size distribution with those used in an actual coking system. In one particular example, sand of particle size between 40 and 400 microns was used. The sand particles were coated with a plastic coating ("Plexiglas") which is soluble in volatile solvents. A solvent, specifically acetone, was introduced at a variable feed rate into the vessel, through inlet 23 under the control of a variable valve 25. The action of the solvent in making the plastic coating sticky or tacky and causing bed agglomeration was strikingly similar to the agglomeration and bed bogging which have been found by actual experience to take place in a fluid bed coking reactor when heavy residual oil is fed thereto. Upon bogging, in either case, a sticky, tacky mass was formed. It will be understood that the sand, "Plexiglas," acetone system simulates the coking system qualitatively. The two differ quantitatively in that the amplitude and frequency of surges indicating bogging in one system may be numerically different from the other system. The trend is the same.

The bottom of the vessel 21 is conical or tapered as indicated at 27 and connects to a downflowing outlet standpipe or line 29. The latter connects to a U-bend 31 which connects to a riser 33 and a return line 35 which reenters an upper portion of vessel 21. Uncondensed vapors (e.g. of solvent, acetone) pass upwardly through a disengaging zone 39 of enlarged cross-section and thence into an outlet line 41 to a suitable recovery apparatus not shown. In a coking system, actually operated as a pilot plant, the hydrocarbon vapors pass overhead in similar fashion.

By the means thus described a fluid bed is maintained in the reactor, or vessel 21, the tackiness or tendency to bog in said bed being controlled by controlling the feed rate and temperature of the bed. The solid particles in the bed itself were continuously circulated through lines 29, 31, 33, and 35. The action of the test apparatus thus simulates the circulation in an actual coker wherein the riser 33 may be considered the equivalent of the conventional burner or solids heater.

A series of pressure taps were connected to the vessel 21 and associated lines at various heights as indicated respectively by the numerals 1, 2, 3a, 3b, and 4 to 12, inclusive. Each of these was connected to a pressure recording device indicated diagrammatically at each of the taps as a conventional instrument 45. The various recording taps were set at different levels in order to obtain pressure reading at various points throughout the apparatus. The overall test apparatus was some 30 feet high. The elevation of the respective taps above a base line is indicated in the following table:

*Table I*

| Tap No. | Elevation, Ft. |
| --- | --- |
| 1 | 9' 2" |
| 2 | 12' 0" |
| 3A | 13' 9" |
| 3B | 13' 9" |
| 4 | 15' 9" |
| 5 | 19' 0" |
| 6 | 34' 6" |
| 7 | 20' 8" |
| 8 | 8' 8" |
| 9 | 5' 3" |
| 10 | 5' 0" |
| 11 | 5' 3" |
| 12 | 5' 6" |

The first bogging tests were made using three sets of pressure taps, 1 to 8, that is the differential pressure between tap 1 and tap 8, taps 2 and 4, and taps 3A and 3B which were at the same elevation on opposite sides of the vessel 21. The feed was injected at this level. Pressure surges of various amplitudes which appeared significant were recorded and these data are tabulated below:

*Table II*

| Time | Feed Rate, g.p.h. | No. of Major Surges per Min. | | |
| --- | --- | --- | --- | --- |
| | | Taps 1–8 | Taps 2–4 | Taps 3A–3B |
| Start | 0.0 | 39 | 67 | 91 |
| 1 Hr. | 3.5 | 34 | 55 | 56 |
| 1 Hr. 48 Min | 6.0 | 35 | 49 | 41 |
| 1 Hr. 54 Min | 6.0 | | | 42 |
| 2 Hrs. (Bed Bogged) | 6.0 | 34 | 29 | 22 |

A further series of tests was made employing 2 sets of pressure taps making recordings over 10 minutes. These taps were respectively a connection between 3A and 3B and dual connections to tap 3A of which one was damped. An electrical measuring device, a delta-pressure cell of conventional type, was used to record the fluctuations in pressure upon a rotating chart of the type shown in Fig. 2. The line 50 in Fig. 2 is a trace for a single revolution, each chart being used for a one minute revolution and then replaced for the next minute. The major surges in pressure are plainly indicated by the peaks 51 in Fig. 2. These data are tabulated below in Table III:

*Table III*

| Time | Amplitude, Inches H₂O | No. of Surges, 3A–3B Taps | | | | No. of Surges 3A Tap | | | |
| --- | --- | --- | --- | --- | --- | --- | --- | --- | --- |
| | | 1–2 | >3 | >6 | Total Surges | 1–2 | >3 | >6 | Total Surges |
| 0 | | 6 | 75 | 46 | 80 | 6 | 64 | 34 | 76 |
| 50 Min | | 10 | 56 | 38 | 64 | 10 | 56 | 34 | 68 |
| 80 Min | | 30 | 44 | 28 | 46 | 34 | 44 | 20 | 60 |
| 90 Min | | 38 | 44 | 32 | 44 | 28 | 48 | 22 | 52 |
| 97 Min | (Bed Bogged) | All | 0 | 0 | 0 | All | 0 | 0 | 0 |

Referring to Table III it will be noted that the most significant change as the tendency of the bed towards bogging was approached was the increase in surges of between 1 and 2 inches of water pressure across the 3A and 3B taps. Larger surges decreased in frequency but the change in the number of surges of the order of 1 to 2 inches of water was a more significant change in this particular laboratory test unit. In the large pilot plant the most significant change occurs in the major surges.

A surge indicating system of this type was applied directly to a fluid bed coking system. In this system two leads from a single pressure tap were connected to a delta-pressure transmitter. A small orifice was connected to one of these leads. This resulted in a damping of the fluid bed surges. During operation of the coker at 950° F. the major pressure surges, i.e., those exceeding 15 inches of water, were recorded and the data are tabulated below:

Table IV

| Time | Feed Rate, b./d. | No. of Surges per Min., 15 Inches Water |
|---|---|---|
| 2:35 p.m. | 55 | 12 |
| 4:10 p.m. | 65 | 8 |
| 7:20 p.m. | 65 | 4 |
| 9:10 p.m. | 0 | [1] 22 |
| 2:45 p.m. | 54 | 2 |
| 3:22 p.m. | 54 | 4 |
| 4:39 p.m. | 54 | 2 |

[1] Feed out 8:50–10:15 to permit bed to dry up.

The tap where the pressure was taken was about midway of the height of the fluid bed between two oil feed nozzles. The frequency of total surges remained approximately constant at 60 per minute. The decrease in frequency of the surges which exceeded 15 inches of water pressure and the substantial decrease of the surges appeared to be indicative of poor fluidization in the coke bed. Subsequently, when the system was shut down after the last recording in Table IV, inspection of the reactor showed clearly that this was the case. Some variation in number and amplitude of major or characteristic pressure surges may be expected under entirely stable operating conditions. However, if amplitude and/or frequency decline consistently by as much as 25% corrective action by reducing the feed rate is indicated. In other words, the frequency and amplitude of the major pressure surges should be kept up to at least 75% of their dry bed values for satisfactory continuous operation over a sustained period of time.

It will be understood that the temperature of a fluid coking bed is an extremely important factor in determining the maximum satisfactory feed rate for a given feed stock. As previously suggested, it is commonly desirable to operate below 1000° F. where gas oil of good quality is an important product to be obtained from the coker. Now the maximum allowable feed rate for a given system must be cut in half for each 30 to 45° F. that the operating temperature is reduced (in the 950° to 1050° F. range). Hence temperature fluctuations must be watched if a unit is operating at or near maximum feed rate.

It has been found, furthermore, that the temperature within a bed begins to drop as bogging conditions are approached, without any change in the setting of the valves which control flow of solids to and from the coker. This relationship is shown in Fig. 3 where a temperature chart of a fluidized coking bed in a 100 b./d. pilot plant is charted. At point $C_1$, in Fig. 3 the bed actually bogged down. At points $C_2$ and $C_3$ the system was on the point of bogging but was saved by cutting off the feed of oil. This allowed the bed to dry up so that normal operation could be resumed. The average bed temperature is indicated by line T. The minimum temperature in the bed is found to be 5° to 10° F. lower at certain times in various places.

It therefore appears that the temperature indicator may and preferably should be used along with the surge meter as a double check to avoid bed bogging. The chart of Fig. 3 was run at much lower speed than that of Fig. 2 and does not show frequency as well. The use of a bed temperature decline under otherwise stable operating conditions to indicate incipient bogging of the bed when operating at or near full capacity is a further feature of the present operation. The significant temperature drop is usually of the order of about 5 to 10° F. but may be slightly less or more under some operating conditions.

Hence, by observing pressure surges within a coking system, and noting the deviation from characteristic frequency and amplitude for the particular vessel when operating with a dry fluid bed, incipient bogging conditions can be detected and the rate of oil feed may be changed to continue the operation and the system without the very expensive and troublesome operation of cleaning out a coking bed which has bogged down.

It should be explained also, that the number of pressure surges in a 24-hour chart (Fig. 2), actually would total many thousands, and that the chart either must be very large or it must be speeded up. For simplicity the number of pressure surges shown in Fig. 2 cover operation for a very short period of time, of the order of a minute or less.

What is claimed is:

The method of operating a fluid bed coking system having a tendency to agglomerate and bog by reason of adhesion of oil coated particles, which comprises passing a gasiform stream upwardly through a bed of preheated fluidizable particles at a sufficient rate to keep said bed turbulent, determining the frequency readings of pressure surges above 15 inches of water characteristic of the bed when dry and stable in fluidity, feeding a heavy hydrocarbon oil into said bed for coking under controlled feed rate conditions, determining the frequency readings of pressure surges above said given amplitude of the bed as the oil is fed and controlling the heavy oil feed rate responsive to the pressure surges of the bed to which the oil is fed so as to maintain its characteristic frequency readings at a minimum of about 75% of the dry bed value.

References Cited in the file of this patent

UNITED STATES PATENTS

| 2,271,148 | Becker et al. | Jan. 27, 1942 |
| 2,606,144 | Leffer | Aug. 5, 1952 |
| 2,788,312 | Moser | Apr. 9, 1957 |